C. F. KETTERING.
STORE SERVICE CREDIT SYSTEM APPARATUS.
APPLICATION FILED FEB. 17, 1906.

1,108,185.

Patented Aug. 25, 1914.
5 SHEETS—SHEET 2.

C. F. KETTERING.
STORE SERVICE CREDIT SYSTEM APPARATUS.
APPLICATION FILED FEB. 17, 1906.

1,108,185.

Patented Aug. 25, 1914.
5 SHEETS—SHEET 3.

C. F. KETTERING.
STORE SERVICE CREDIT SYSTEM APPARATUS.
APPLICATION FILED FEB. 17, 1906.

1,108,185.

Patented Aug. 25, 1914.

UNITED STATES PATENT OFFICE.

CHARLES F. KETTERING, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

STORE-SERVICE-CREDIT-SYSTEM APPARATUS.

1,108,185. Specification of Letters Patent. Patented Aug. 25, 1914.

Application filed February 17, 1906. Serial No. 301,707.

*To all whom it may concern:*

Be it known that I, CHARLES F. KETTERING, a citizen of the United States, residing at Dayton, in the county of Montgomery and State of Ohio, have invented certain new and useful Improvements in Store-Service-Credit-System Apparatus, of which I declare the following to be a full, clear, and exact description.

This invention relates to store service systems, and has for its main object to provide mechanism for assisting in the authorization of credit sales.

In many commercial houses the problem of compelling sales people to secure proper authorization before making a sale on credit is a very important one. It is obviously unsafe in most cases to trust the judgment of the clerk as to whether credit should be allowed, and to compel a message being set to some credit man who is authorized to allow credit is a lengthy and tedious proceeding. In may cases an improvement has been made by using the telephone, over which the credit man is communicated with; but even in such cases there is nothing to show that the credit man really authorized any particular transaction, and it must depend ultimately upon the word of the clerk. The invention is designed, therefore, to obviate this difficulty by providing a means for making a permanent record on a sales slip authorizing credit in a particular case, and so arranging the devices that the means can only be operated by the credit man and not by the clerk. In particular an electrically-operated device is provided to stamp an inserted sales slip, and electrical connections to the credit man's desk are also provided with means for controlling a stamping device from that point. In a prior application, Serial No. 236,893, filed Dec. 14, 1904, and upon which Patent No. 975,533 was issued November 15, 1910, there is shown a device of this general type, and the present invention is designed as an improvement thereon.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings.

In this system a telephone is provided for the clerk or cashier-inspector, and a circuit is run to a switch-board at the credit man's desk. When credit is to be authorized, the clerk calls up the credit man in the usual way by raising the telephone receiver from the hook. This notifies the credit man that his attention is desired by a lamp signal, as shown in this particular embodiment. He then connects his telephone set with that of the clerk and actuates a signal at the clerk's station to indicate that he is ready to be communicated with. The clerk then reads off the amount of the sale and name of the customer desiring credit, and if such credit is to be given the credit man then operates a switch controlling the stamp and causes an impression to be made on the sales slip authorizing the credit. If, however, the credit is not to be given the credit man can communicate over the telephone with the clerk and give whatever instructions are necessary, such as a request that the customer call at the office.

Figure 2:
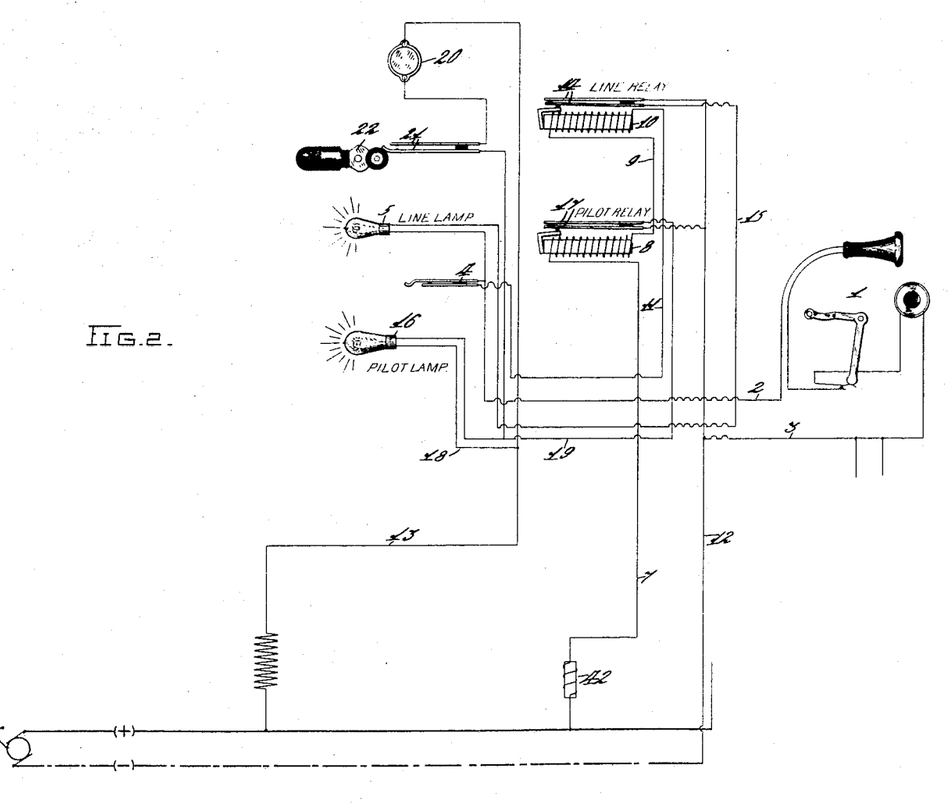
Fig. 2 is a diagram of the circuit for calling up the credit man from the clerk's station.

Describing the invention more particularly, and referring first to Fig. 2, it will be seen that this diagram shows the calling-up circuit for the clerk's station. It comprises a telephone set, generally indicated by the numeral 1, from which line wires 2 and 3 run to a jack 4, and also through the line lamp 5. The clerk, when desirous to call the credit man, removes the receiver from the hook in the usual way, and circuit is then made from the generator 6 over the main line wires indicated in heavy lines, wire 7, relay 8, wire 9, relay 10, wire 11, jack 4, wire 2, telephone set 1, wire 3, wire 12, back to the main line. This energizes relays 8 and 10, and circuit is thereby closed as follows through the line lamp: from the generator 6, through the negative main line, wire 12, contacts 14, controlled by relay 10, wire 15, lamp 5, jack 4, wire 11, and back to the positive line through relays 10 and 8 and wire 7. This, therefore, will cause line lamp 5 to be illuminated, and the credit man will therefore be notified that his attention is desired. A pilot lamp 16 is also connected to be illuminated when any telephone receiver is taken from the hook, and the circuit for this is controlled by relay 8. When this relay is energized, contacts 17 will be closed and a circuit then be made from generator 6, positive main line, wire 13, wire 18, pilot lamp 16, wire 19, contacts 17, wire 12, and negative main line back to the battery. This pilot lamp will therefore be lighted when any receiver is taken from the hook, and the particular line lamp 5 allotted to the call line will also be lighted. If desired, a buzzer 20 may be connected in parallel with the pilot lamp 16 for use in case the credit man desires to leave his desk temporarily. This buzzer, as shown, is normally disconnected as contacts 21 are open, but a switch 22 is provided for closing them, and in such case the buzzer will be sounded whenever the pilot lamp 16 is lighted, thus audibly calling attention to the desire for communication.

It will be observed by reference to Fig. 2 that the arrangement of circuits in this figure differs from that used in general telephone work in that the line lamp 5 will not be extinguished if the telephone receiver is replaced on its hook. In many modern telephone exchanges lamp signals are used in place of the older annunciator drop and these signals are controlled by relays whose circuit is made by removing the receiver from its hook allowing the same to close a contact. When the receiver is restored, however, the relay is deënergized. In the system disclosed in the present invention the lamp 5 is, it is true, controlled by relay 10 which closes contacts 14 and makes circuit as previously traced through the lamp, but it will be seen, that this lamp circuit also passes through the coil of relay 10 and thereby retains contacts 14 closed. This relay is therefore a locking relay and maintains its own circuit closed. To extinguish lamps it is necessary to insert the plug in spring jack 4 thereby separating the contacts in said jack. The pilot lamp, is wired in the same manner and will not be extinguished if the receiver is replaced.

The manner of connecting up line lamp 5 is an important feature of the invention on account of the time thereby saved to the clerk calling up. It was stated that the receiver may be replaced on the hook without extinguishing the lamp but it will be evident that the receiver need not be removed from the hook at all, it being sufficient in order to call the credit man simply to raise and lower the hook. The line lamp 5 will then be lighted and remain so until the credit man plugs in to answer. This evidently will be economical of time for the clerk as other matters may be attended to until the credit man is ready to give attention and so announces by signaling the clerk as hereinafter described. This is also desirable from the standpoint of the customer who is saved the possible embarrassment of having the clerk directly inquire if credit should be given. With this system the clerk by a momentary action raises the receiver and pays no further attention until a call (apparently originating from the other end of the line) is received when only the name of the customer and the amount need be read off, no question as to credit being asked, so that to all appearances simply a report of the transaction has been made over the telephone.

Figure 3:
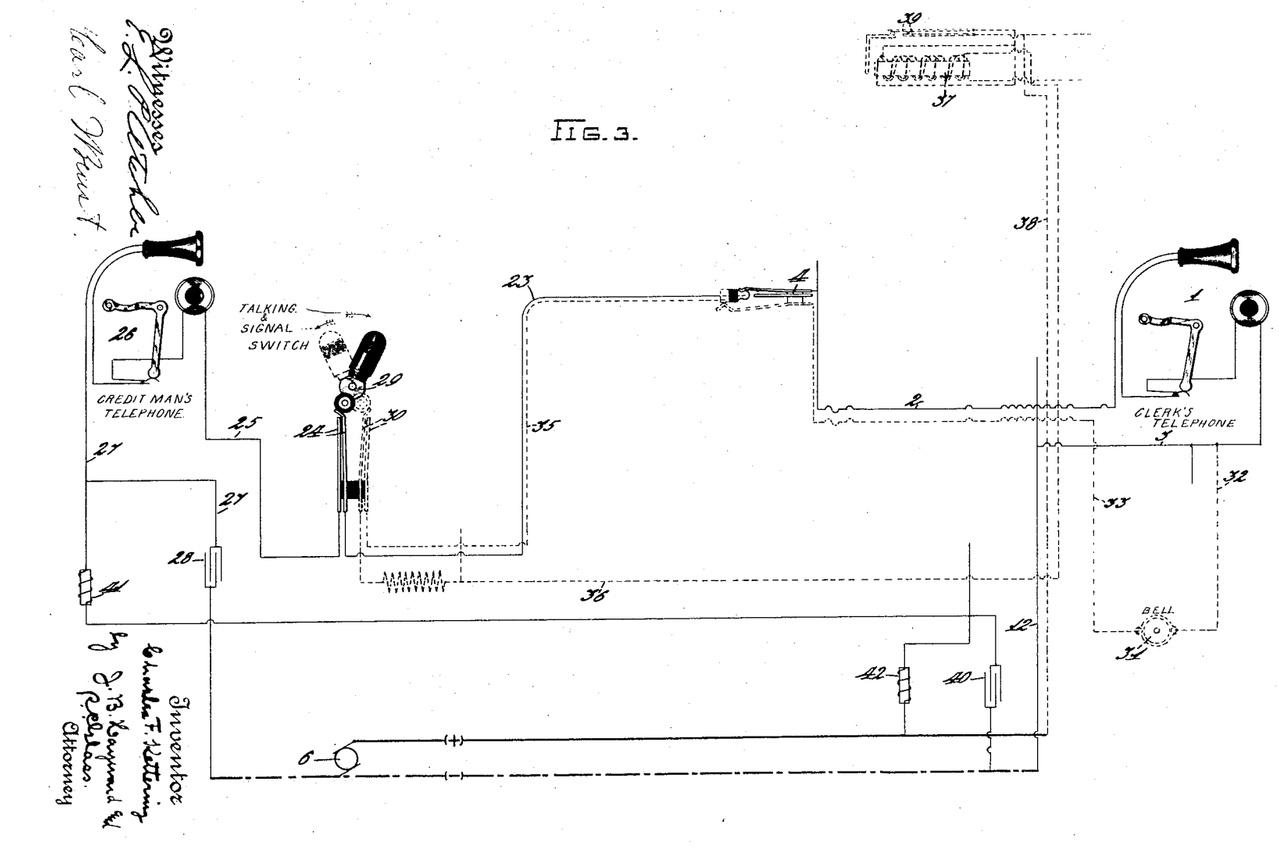
Fig. 3 is a diagram of the talking and signal circuits.

Referring now to Fig. 3 it will be seen that this diagram indicates the condition of the system after a call has been made and the plug inserted in the line jack. The talking circuit in this figure is shown in full lines, and includes generator 6, negative main line, wire 12, wire 3, telephone set 1, wire 2, jack 4, wire 23, contacts 24, wire 25, telephone set 26, and the wire 27 through coils 41 and 42 back to the generator. It will be noted, as is usual in telephone work, that the insertion of the plug in the jack has separated contacts 4, thereby allowing the line and pilot lamp to be extinguished and making circuit through the credit man's telephone set. With the system as shown, it is not necessary that the clerk should keep the receiver to his or her ear until the credit man answers, as means are provided for sounding an alarm, as, for example, by a buzzer at the clerk's station when the credit man is ready to answer. This means includes the switch 29, which controls contacts 24 and contacts 30. The switch when in the position shown in full lines closes the talking circuit at contacts 24, and when in the position shown in dotted lines closes the signal circuit, actuating the buzzer or signal 31 to call the clerk's attention. When switch 29 is thrown to the position in dotted lines in this figure, circuit will be made including generator 6, negative main line, wire 12, and wire 3, wire 32, signal device 31, wire 33, dotted line contact of line jack 4 to the ring of the plug, wire 35, contacts 30, wire 36 through the circuit breaker 37 and back by wire 38 and positive main line to the generator. This circuit breaker 37 has both a low and a high resistance winding, and the circuit is normally made only through the low resistance, the high resistance being short-circuited by contacts 39 indicated in dotted lines in this figure. When buzzer 31 is in circuit, its resistance is enough to reduce the quantity of current flowing over the line to too low an amount to operate the armature of circuit breaker 37, which armature when operated opens contacts 39 and thereby throws into circuit the high resistance of the circuit breaker. This device will be more fully described hereinafter, as it is of especial use in connection with the stamping circuit. With the circuits shown on Fig. 3, it is evident that communication may be had over the talking circuit shown in full lines, and if the credit man desires to call the clerk's attention when he or she has taken the receiver away from his or her ear, it may be done by throwing the switch 29 into the dotted line position, thereby closing the circuit through buzzer 31. In Fig. 3 is also shown a device, comprising the condensers 28 and 40 and inductances 41 and 42, the condensers being bridged in the main line and the inductances being in series therein. These devices are not essential to a reasonably satisfactory working of the system, but as in this system the current is not supplied from a battery, as is usual in telephone practice, but from a direct current generator, they are used to eliminate undesirable effects due to the commutation of the dynamo. As is well known a so called direct current dynamo gives a uni-direction current of nearly a constant voltage. There are, however, small variations due to the different relation which the coils of the generator assume with relation to the electro-magnets thereof, so that the real current derived is not of an absolutely constant voltage as is that from a storage battery, but oscillates to a small extent between certain minimum and maximum voltages without ever declining to zero, as would be the case with the alternating machine. This current may therefore be considered as made up of a current of constant voltage, and which has superposed an additional current in the same direction, but varying from zero to a small maximum of voltage. This variable current is harmful in a telephone, inasmuch as it produces variations in magnetism of the receiver coil, and therefore tends to produce undesirable noises in the receiver. Inductances 41 and 42, as may be seen from tracing out the circuits on this figure are in series with the line and have their usual effect of retarding changes of voltage in the current. As is well known, inductance or retardation coils offer a resistance to the passage of a steady current, determined only by their ohmic resistance, but to a changing current, and especially to a rapidly changing current, they offer a very large impedance in comparison with which their ohmic resistance is almost negligible. It is evident, therefore, that for the steady current referred to above these coils offer no impedance, and are also only objectionable because of their ohmic resistance; while as to the varying current, they will almost entirely prevent its passage. The condensers 28 and 40 are bridged across the line and assist in the function above described in connection with the inductances 41 and 42. It is well known that a condenser offers a very large resistance to the passage of a direct current, but only a very slight impedance to the passage of a pulsating or alternating current. It is evident, therefore, that the variations in current above described will be furnished a short and electrically easy path back to the generator by passing through the condensers, whereas the constant current will find it almost impossible to pass through the condensers, and will be compelled to pass over the line including the telephone sets. These inductances 41 and 42 and condensers 28 and 40 therefore furnish means for eliminating noises in the talking circuit due to the commutation of the dynamo.

Figure 4:
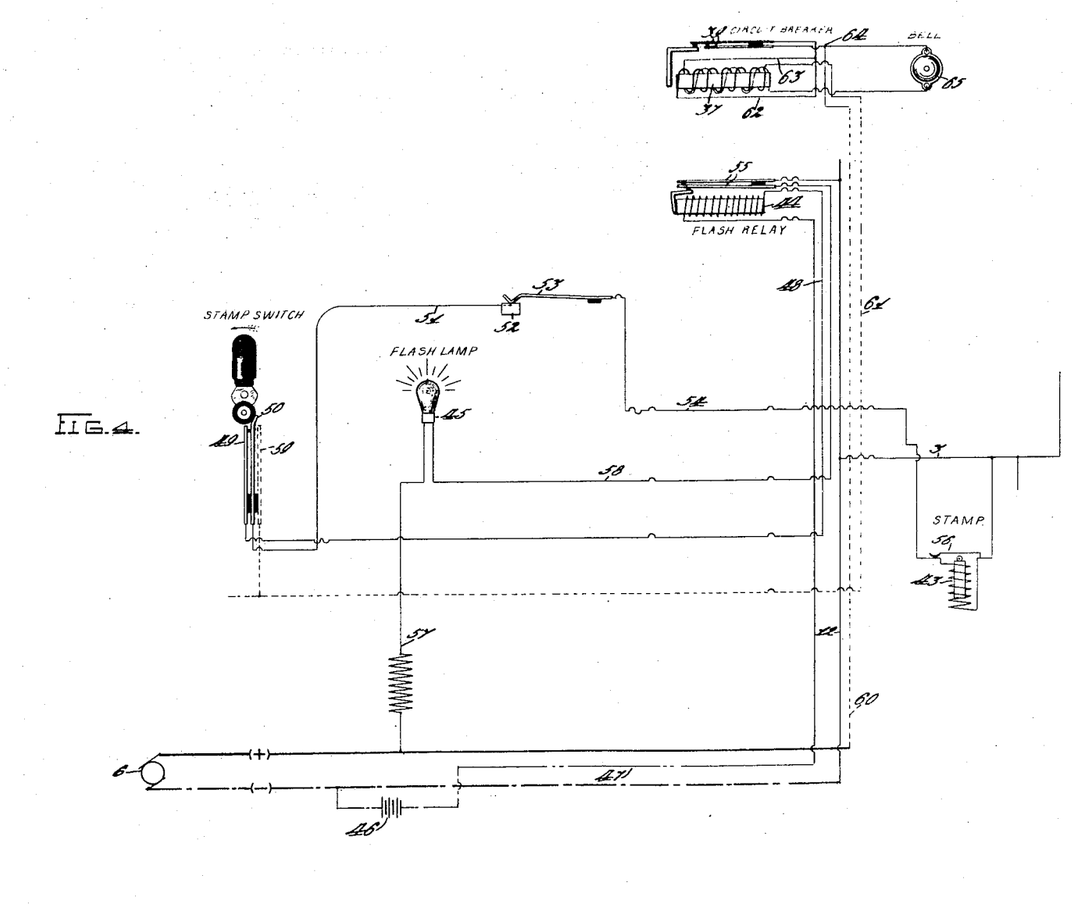
Fig. 4 is a diagram of the stamping circuits and devices operative therewith.

In Fig. 4 is shown the stamping circuit of the device. After communication has been established between the credit man and the clerk, and the credit man is satisfied to allow credit in the particular case, he moves the switch shown in this figure and thereby operates the stamp indicated diagrammatically at 43. This provides a warrant for the clerk to allow a credit, as the stamp marks such matter as "Charge" and the date on the slip inserted in the stamp. Referring more particularly to this figure, it will be seen that when the plug is inserted in the line jack, that the sleeve of the plug is in contact with one of the springs in the contact. A relay 44, as shown in this figure, controls a flash lamp 45 for indicating whether the sales slip has been inserted in the stamp. The circuit for this relay does not include the generator 6, but does pass through a battery 46 of low voltage. The circuit will be made from this battery over wire 47, through relay 44, wire 48, contacts 49 and 50 of the switch, wire 51, sleeve 52 of the plug, spring contact 53 of the jack, wire 54, through stamp 43 and back over wire 3 and 12 to the negative main line, and back to the battery 46. This current is of so low voltage that if it passes through the stamp coil 43 the resistance of this coil and that of the relay 44 will prevent passage of enough current to close contacts 55, but the stamp coil 43 is normally short-circuited at 56, this short-circuiting device being displaced when the paper is inserted in the stamp. If, therefore, no paper is in the stamp and the coil 43 is short-circuited at 56, enough current will then pass over the circuit including battery 46, through the relay 44, to cause the armature of said relay to close contacts 55, thus making a local circuit through the flash lamp 45. This circuit includes wire 57, flash lamp 45, wire 58, contacts 55 of relay 44, wire 12, and negative main line back to the generator. The illumination of this lamp 45 will therefore give warning to the credit man that the paper has not been placed in the stamp, and he will therefore not operate the switch to close the stamp circuit, but will call the clerk's attention over the talking circuit to the fact. If paper has been inserted in the stamp, the switch shown in Fig. 4 will be moved so as to break the circuit at contacts 49 and 50 and make the circuit at contact 50 to dotted line contact 59. The stamp circuit, which is mostly shown in dotted lines in this figure, will then be complete and the paper stamped with the desired matter, this circuit running from the generator 6, positive main line, wire 60, through circuit breaker 37, wire 61, contact 59, contact 50, wire 51, sleeve 52, spring 53, wire 54, stamp coil 43, and back over wires 3 and 12 and the negative main line to the generator. In the usual operation of the apparatus, this will stamp the inserted slip and complete the operation, but a device is also provided so that if the credit man should attempt to operate the stamp while it is short-circuited from no paper having been inserted, an additional signal will be brought into operation to serve in conjunction with flash lamp 45 to announce to the credit man that the sales slip has not been inserted in the stamp. This device comprises a single stroke bell 65, shown on this figure, and connected in series with the high resistance winding of circuit breaker 37. If an attempt is made to close contacts 50 and 59 while stamp 43 is short-circuited at 56, a circuit of very low resistance will be made, including short-circuit 56 and the low-resistance winding of circuit breaker 37. This would allow a large amount of current to flow over the wire, enough possibly to cause damage to the system, by burning out some part thereof, and means are therefore provided for throwing into circuit under such conditions the high resistance coil of circuit breaker 37. As indicated on this figure, the normal circuit includes wire 61 leading to the low resistance coil, from which wire 62 leads to contacts 39, but in a branch to this circuit is a wire 63 leading through the high resistance coil of the circuit breaker, then through the signal device 65 and back to the point 64 at which it joins the circuit through the contacts 39. It is evident from this structure that if much current comes over the line through the low resistance winding of circuit breaker 37, then the armature thereof will be energized, breaking contacts 39 and causing the current to proceed over the high resistance winding and through the signal device 65. This both reduces the current to a value such that no damage will be caused to the system, and also announces to the credit man that no slip has been inserted in the stamping device. If, on the other hand, a slip has been inserted, thereby breaking the circuit over the wire 56 and compelling the current to traverse the stamp coil, there will then be enough resistance in the line to prevent the armature of circuit breaker 37 from throwing in the high resistance winding and the alarm device 65, so that this signal will not then be operated nor, in fact, will the flash lamp 45 be lighted, for the circuit from battery 46 will then include both the stamp coil 43 and relay coil 44, and will be too small in value to energize said relay.

Figure 5:
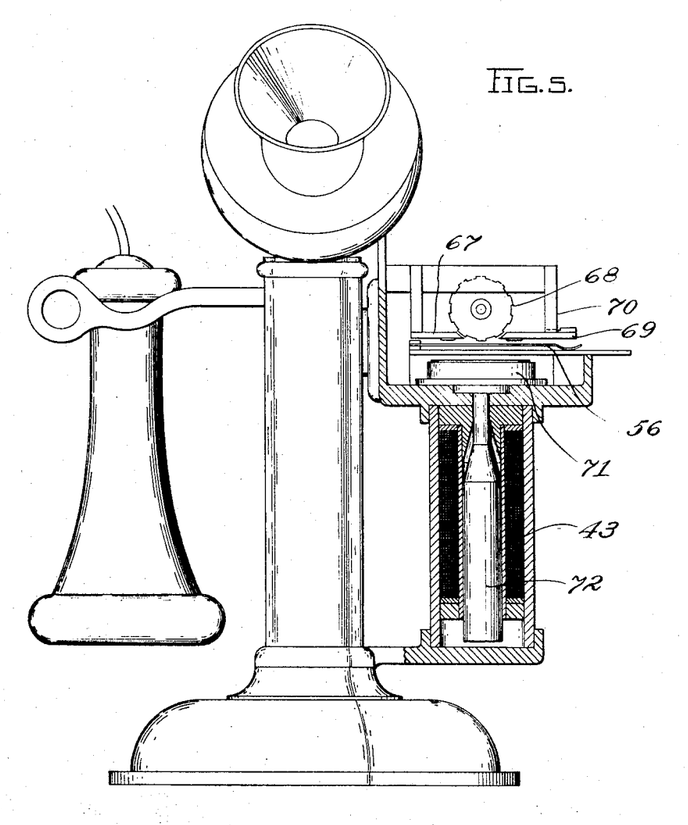
Fig. 5 is a front elevation of a telephone set furnished with the stamping device and showing the stamping device in section.

The construction of the stamping device which is diagrammatically shown in Fig. 4 may be seen from Fig. 5. In this figure, the type-carrying members are shown at 67, 68 and 69. The member 67 is permanently fixed within the casing and carries type for printing the word "Charge", or the like. The type-carriers 68 are adjustable dating wheels. The carrier 69 is removable, being dove-tailed into the support 70 and is provided with the clerk's number or other identifying device. The platen 71 is mounted upon the iron core 72 of the coil 43. When the current is permitted to pass through the coil 43 the core 72 will tend to center itself within the coil and thus cause an impression to be made upon the sales slip which has been inserted between the spring switch device 56 and the platen. The energizing of the coil 43 is dependent upon the operation of the switch 56 through the insertion of a sales slip and the closing of a switch at the credit-man's station as has been fully explained.

Figure 1:
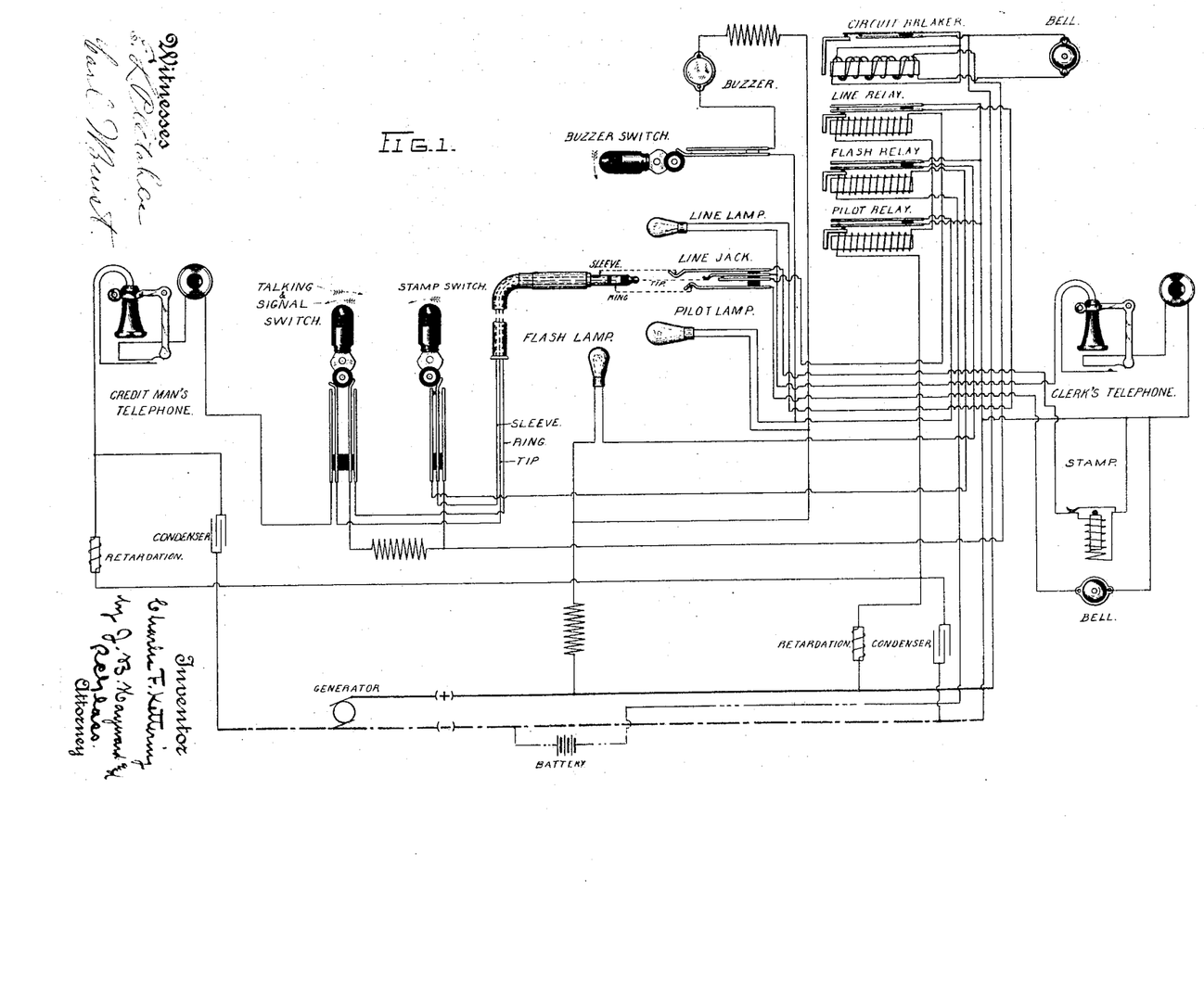
Figure 1 is a diagram of the complete system.

The circuits of Figs. 2, 3, and 4, which have been described, are all shown on Fig. 1, and it is thought that the operation of the system will be evident from the previous description. To briefly recapitulate, however, the operation may be described as follows: The clerk first removes the telephone receiver from the hook, allowing the contact controlled thereby to close circuits for a line lamp and pilot lamp by means of the contacts controlled by the line and pilot relays. The clerk then, if desired, lays the receiver down, or in fact may replace it on the hook, as it is not necessary to listen thereat until called by the operation of the bell. When the credit man is ready to attend, the plug is placed in the jack, thereby making the contacts as indicated in dotted lines in Fig. 1. The talking and signal switch is then moved in the direction of the upper arrow in this figure, thereby closing the talking circuit and establishing communication between the two telephones. The clerk then reads off the amount and customer's name, and if credit is to be given, the stamp switch is operated in the direction of the arrow in this figure, thereby closing the circuit through the stamp and marking the slip. If, in this case, no paper has been inserted in the stamp the flash lamp will be lighted, and when the stamp switch is moved the bell shown at the top of the figure will ring and the circuit breaker will throw in the additional high resistance. If the credit man desires for any reason to communicate with the clerk, the talking and signaling switch may be moved in the direction of the lower arrow, when the bell at the clerk's station will be rung and attention therefore called. If the credit man desires to leave his position temporarily, the buzzer switch is thrown in the direction indicated by the arrow, therewith closing the circuit through the buzzer in parallel with that through the pilot lamp. The retardation coils and condensers shown in this figure serve to regulate the current from the generator and prevent objectionable noises in the telephone.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

The details of the stamp illustrated diagrammatically herein are fully shown in the prior application and are not a part of the present invention. As stated in said prior application the provision of a shunt to the stamp actuating coil and the indicating devices coacting therewith are regarded as important features of the invention. It will be evident if no such means was provided that the clerk could procure fraudulent stamping, as by calling the credit man and stating that in the previous operation the insertion of the paper had been omitted. A second operation would then be necessary and this second slip could be used by the clerk for defrauding the proprietor.

What is claimed is as follows;

1. A store service system having in combination with a telephone line including telephone sets, an electrically controlled stamping device, a circuit for same including a distant switch for operatively controlling the stamping device, and means for indicating by the operation of the switch the absence of an article to be marked.

2. A store service system having in combination with a means of communication, a stamping device, distant means for controlling the operation of said device and means at said distant controlling means for indicating the absence of an article to be marked when the controlling means is actuated.

3. A store service system having in combination with a telephone line for communication, an electrically controlled stamp, an electric circuit and circuit closer for operatively controlling said stamp from a distance, and means at said circuit closer and controlled thereby for audibly announcing the absence of an article to be stamped when the circuit closer is operated.

4. A store service system having in combination with a means of communication, a stamp, means for controlling the operation of said stamp from a distance, means at the said controlling means giving warning of the absence of an article to be marked, and means at said controlling means for announcing the said absence when the warning means is unheeded and the controlling means operated.

5. A store service system having in combination with a telephone system, an electrically controlled stamp, a circuit closer distant from the stamp and having connections for controlling the operation of the latter, a local circuit including a lamp near the circuit closer, a relay for controlling the local circuit, and means regulated by the presence of the article to be marked for rendering the relay ineffective.

6. A store service system having in combination with a means of communication, a marking device, means distant from the marking device for controlling the operation of the same, a signal giving warning of the absence of an article to be marked, and a signal ditinguishable from the first mentioned signal giving notice of the said absence when the warning signal is unheeded and the controlling means is operated.

7. In a store service system the combination with a means of communication, of an electrically controlled stamping device having electrical resistance, an electric circuit for controlling the operation of the stamping device, means for normally short circuiting said resistance, and a circuit controller for throwing in additional electrical resistance if circuit is made when the stamping device is short circuited.

8. In a store service system, the combination with a telephone line, of an electrically controlled stamp, means having electrical resistance for controlling the operation of the same, a circuit closer connected in circuit with said means, means normally short circuiting said resistance, a compensating resistance, and means for throwing it in circuit if circuit is made when the stamping device is short circuited.

9. In a store service system, the combination of a means of communication, of an electrically controlled stamping device having electrical resistance, a circuit closer connected in circuit with the stamp for controlling the operation of the same, means normally rendering the stamp inoperative, and means for adding resistance to the circuit when said circuit closer is operated with the stamp in normal condition.

10. In a store service system, the combination with a telephone system, of an electrically controlled stamp adapted to be short circuited and electrical means for controlling the operation of the same including a circuit closer for controlling the electrical means, means for short circuiting the stamp, and means for changing the current's strength when the circuit closer is operated while the stamp is short circuited.

11. In a store service system, the combination with a telephone line, of an electrically controlled stamp device, means having electrical resistance for controlling the operation of the said device said means including a circuit closer, means for short circuiting said resistance to render said stamp inoperative, and a compensating resistance automatically thrown into circuit if said circuit closer is operated while the stamp resistance is short circuited.

12. In a store service system, the combination with a telephone line, of an electrically controlled stamping device, electrical means for controlling the operation of the stamping device said means including a distant circuit closer, means normally rendering said electrical means inoperative, an indicator local to the circuit closer, a circuit therefor, and a relay for closing said indicator circuit when said electrical means is in inoperative condition.

13. In a store service system, the combination with a line for electric transmission, of an electrically controlled stamp associated therewith, means for short circuiting said stamp, a distant means for controlling said stamp, and a local circuit at the controlling means closed by the current in the line for transmission when short circuited and including a lamp for indicating that the stamp is short circuited.

14. In a store service system, the combination with a line for electric transmission, of an electrically controlled stamping device therein having electrical resistance and means for short circuiting same, means for operatively controlling said stamp from a distance and a lamp at the controlling means controlled by the short circuiting of the resistance for indicating that the stamp is short circuited.

15. In a store service system, the combination with a line for electric transmission of an electrically controlled marking device controlled thereby, means normally rendering the device inoperative, a distant circuit controller in said line, and a plurality of distinguishable means controlled by the operativeness of the marking device for warning that the device is in normal condition.

16. In a store service system, the combination with an electric circuit, of a coil therein having electrical resistance, a stamping device operated by said coil, means normally short circuiting said coil, a switch controlling said circuit, a relay in said circuit, a signal controlled by the operations of the relay, and a generator in the circuit for operatively energizing said relay only when the coil is short circuited.

17. In a store service system, the combination with a line, of a stamping device, means in said line for operating said device, means preventing operation of said stamp in the absence of the article to be marked, and alarm means brought into operation when attempt is made to operate said stamp while the said preventing means is performing its function.

18. In a store service system, the combination with a line for electric transmission of a stamping device operated therefrom, means normally preventing operation of said device, a circuit controller having a normally short circuited high resistance, and means for adding said high resistance to the line when attempt is made to operate the stamp while the same is inoperative.

19. In a store service system, the combination with an electrically controlled stamping device normally inoperative but rendered operative by the presence of an article to be stamped, of a circuit for same including a distant switch, and means controlled by the operativeness of the stamping device for indicating by the operation of the switch, the absence of an article to be marked.

20. A store service system having in combination with a telephone line, an electrically controlled stamping device rendered operative by the presence of an article to be stamped, means for controlling the operation of said device from a distance and means at said distant controlling means controlled by the operativeness of the stamping device for indicating the absence of an article to be marked when the operating means is actuated.

21. A store service system having in combination with a line for communication, an electrically controlled stamp rendered operative by the presence of an article to be stamped, an electric circuit and circuit closer for controlling the operation of said stamp from a distance, and means at said circuit closer and controlled by the operativeness of the stamp for audibly announcing the absence of an article to be marked when the circuit closer is operated.

22. A store service system having in combination with a line for communication, a marking device rendered operative by the presence of an article to be marked, means for controlling the operation of said device from a distance, a signal giving warning of the absence of an article to be marked, a signal distinguishable from the first mentioned signal giving notice of the said absence when the warning signal is unheeded and the means for controlling the marking device from a distance is operated and means controlled in accordance with the operativeness of the marking device for operating said signals.

23. In a store service system the combination with a telephone system, of an electrically controlled stamp and electrical means for controlling the operation of the same, means for changing the operativeness of said means, a circuit closer and connections to said electrical means for operating said stamp, and means for changing the current strength when the circuit closer is operated while the operativeness of the operating means is unchanged.

24. In a store service system, the combination with a means of communication, of an electrically controlled stamping device having means for changing its operativeness, a circuit closer and connections with the stamping device for controlling the operation of said stamp, and means for otherwise changing the current strength of the circuit when the circuit closer is operated while the operativeness of the stamping device is unchanged.

25. A store service system, having in combination with a telephone line, a stamping device, means at said device for controlling its operation, distant means for causing the operation of said device, a device adjacent said distant means indicating the condition of said controlling means, and a device also adjacent said distant means for giving an indication of the condition of said controlling means when the distant means is operated which is distinguishable from the first mentioned indication.

26. A store service system having in combination with a telephone line, a stamping device, means for operating same, devices adjacent said stamping device for controlling the operation thereof, distant means for causing the operation of said stamping device, and means for announcing at said distant means that the controlling device is in normal condition.

27. In a store service system, the combination with a marking device, a distant means for controlling the operation of the same, and means controlled by the controlling means for indicating the absence or presence of the article to be marked.

28. In a store service system, the combination with an electrically controlled marking device, an electrical means for controlling the operation of the same, and means controlled by the electric controlling means for indicating the absence or presence of the article to be marked.

In testimony whereof I affix my signature in the presence of two witnesses.

CHARLES F. KETTERING.

Witnesses:
   CHAS. D. BRONSON,
   J. B. HAYWARD.